United States Patent
Hanai et al.

(10) Patent No.: US 9,589,137 B2
(45) Date of Patent: Mar. 7, 2017

(54) METHOD FOR DETECTING UNFAIR USE AND DEVICE FOR DETECTING UNFAIR USE

(71) Applicant: Hitachi, Ltd., Tokyo (JP)

(72) Inventors: Tomohiro Hanai, Tokyo (JP); Katsuro Kikuchi, Tokyo (JP); Tomohiro Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/424,182

(22) PCT Filed: Mar. 1, 2013

(86) PCT No.: PCT/JP2013/055616
§ 371 (c)(1),
(2) Date: Feb. 26, 2015

(87) PCT Pub. No.: WO2014/132431
PCT Pub. Date: Sep. 4, 2014

(65) Prior Publication Data
US 2016/0012230 A1    Jan. 14, 2016

(51) Int. Cl.
*G06F 21/00*        (2013.01)
*G06F 21/57*        (2013.01)
(Continued)

(52) U.S. Cl.
CPC ............ *G06F 21/57* (2013.01); *G06F 21/316* (2013.01); *G06F 21/552* (2013.01); *G06F 21/88* (2013.01);
(Continued)

(58) Field of Classification Search
USPC ........................................................... 726/6
See application file for complete search history.

(56) References Cited

U.S. PATENT DOCUMENTS 8,793,255 B1 *   7/2014   Bilinski ............ G06F 17/30867
                                                            707/740
2012/0246735 A1 *   9/2012   Peeters ................ G06F 21/552
                                                            726/26
(Continued)

FOREIGN PATENT DOCUMENTS

| JP | 2006-260454 A | 9/2006 |
| JP | 2009-175984 A | 8/2009 |
| JP | 2011-197802 A | 10/2011 |

OTHER PUBLICATIONS

PCT International Search Report on application PCT/JP2013/055616 mailed May 28, 2013; 2 pages.

*Primary Examiner* — Jason Lee
(74) *Attorney, Agent, or Firm* — Foley & Lardner LLP

(57) ABSTRACT

An object is to improve detection accuracy of unfair use when a task system is used by using a mobile terminal.
There is provided a method for detecting unfair use including: recording a plurality of operation feature quantities which are calculated from an operation log of a user and weights for the plurality of operation feature quantities of the user which are calculated by using a plurality of operation feature quantities of other users, obtaining an operation log of the user of a terminal device, calculating a plurality of operation feature quantities from the operation log, calculating similarity between the calculated plurality of operation feature quantities and the recorded plurality of operation feature quantities of the user in advance, by using the weights for the plurality of operation feature quantities, and detecting unfair use of the terminal device.

13 Claims, 12 Drawing Sheets

(51) Int. Cl.
*G06F 21/31* (2013.01)
*G06F 21/55* (2013.01)
*H04L 29/06* (2006.01)
*G06F 21/88* (2013.01)

(52) U.S. Cl.
CPC ........ *H04L 63/08* (2013.01); *G06F 2221/034* (2013.01)

(56) References Cited

U.S. PATENT DOCUMENTS

| | | | |
|---|---|---|---|
| 2013/0067572 A1* | 3/2013 | Muramoto | H04L 63/1408 726/22 |
| 2013/0097709 A1* | 4/2013 | Basavapatna | G06F 21/552 726/25 |

* cited by examiner

Fig. 3

| USER ID | DATE AND TIME | PAGE URL | EVENT TYPE | ATTRIBUTE VALUE |
|---|---|---|---|---|
| User_A | 2012/09/11 10:00:00.000 | http://~ | load | |
| User_A | 2012/09/11 10:00:05.000 | : | geolocation | latitude=35.7,longitude=139.75,speed=0.01 |
| User_A | 2012/09/11 10:00:05.000 | : | devicemotion | X=0.00,Y=0.80,Z=0.10 |
| User_A | 2012/09/11 10:00:10.000 | : | touchstart | X=100,Y=200 |
| User_A | 2012/09/11 10:00:10.500 | : | touchend | X=200,Y=250 |
| User_A | 2012/09/11 10:00:10.500 | : | scroll | X=+100,Y=+50 |
| User_A | 2012/09/11 10:00:15.000 | : | orientationchange | +90(landscape) |
| User_A | 2012/09/11 10:00:20.000 | : | keypress | key=xyz |
| User_A | 2012/09/11 10:00:25.000 | : | click | X=200,Y=400,type=submit |
| User_A | 2012/09/11 10:00:30.000 | : | unload | |
| : | : | : | : | : |

| PAGE URL (401) | USER ID (402) | USE CIRCUMSTANCE (403) | $V_1$ (404) | $V_2$ (405) | ... | $V_N$ (406) |
|---|---|---|---|---|---|---|
| http://.../a/ | User_A | ON TABLE | $V_{A1\_D}$ | $V_{A2\_D}$ | ... | $V_{AN\_D}$ |
| http://.../a/ | User_A | HELD WITH HAND | $V_{A1\_H}$ | $V_{A2\_H}$ | ... | $V_{AN\_H}$ |
| http://.../a/ | User_B | ON TABLE | $V_{B1\_D}$ | $V_{B2\_D}$ | ... | $V_{BN\_D}$ |
| http://.../a/ | User_B | HELD WITH HAND | $V_{B1\_H}$ | $V_{B2\_H}$ | ... | $V_{BN\_H}$ |
| http://.../a/ | User_C | ON TABLE | $V_{C1\_D}$ | $V_{C2\_D}$ | ... | $V_{CN\_D}$ |
| http://.../a/ | User_C | HELD WITH HAND | $V_{C1\_H}$ | $V_{C2\_H}$ | ... | $V_{CN\_H}$ |
| http://.../a/ | ... | ... | ... | ... | ... | ... |
| http://.../a/ | AVERAGE | ON TABLE | $V_{1\_avg\_D}$ | $V_{2\_avg\_D}$ | ... | $V_{N\_avg\_D}$ |
| http://.../a/ | AVERAGE | HELD WITH HAND | $V_{1\_avg\_H}$ | $V_{2\_avg\_H}$ | ... | $V_{N\_avg\_H}$ |
| http://.../b/ | ... | ... | ... | ... | ... | ... |
| ... | | | | | | |

Fig. 5

| PAGE URL (501) | USER ID (502) | USE CIRCUMSTANCE (503) | $W_1$ (504) | $W_2$ (505) | ... | $W_N$ (506) |
|---|---|---|---|---|---|---|
| http://.../a/ | User_A | ON TABLE | $W_{A1\_D}$ | $W_{A2\_D}$ | : | $W_{AN\_D}$ |
| http://.../a/ | User_A | HELD WITH HAND | $W_{A1\_H}$ | $W_{A2\_H}$ | : | $W_{AN\_H}$ |
| http://.../a/ | User_B | ON TABLE | $W_{B1\_D}$ | $W_{B2\_D}$ | : | $W_{BN\_D}$ |
| http://.../a/ | User_B | HELD WITH HAND | $W_{B1\_H}$ | $W_{B2\_H}$ | : | $W_{BN\_H}$ |
| http://.../a/ | User_C | ON TABLE | $W_{C1\_D}$ | $W_{C2\_D}$ | : | $W_{CN\_D}$ |
| http://.../a/ | User_C | HELD WITH HAND | $W_{C1\_H}$ | $W_{C2\_H}$ | : | $W_{CN\_H}$ |
| http://.../b/ | : | : | : | : | : | : |
| : | : | : | : | : | : | : |

METHOD FOR DETECTING UNFAIR USE AND DEVICE FOR DETECTING UNFAIR USE

TECHNICAL FIELD

The present invention relates to a method for specifying a user in a computation device system.

BACKGROUND ART

A mobile terminal such as a smartphone and a tablet terminal, have rapidly come into wide use and thus the number of employees using this type of terminal and performing a task has increased. However, there is a risk in that when a third party makes wrong use of a terminal due to loss or robbery of the terminal, unfair access to an internal system causes a leakage of information and the like to occur. Generally, security countermeasures (terminal lock, remote wipe, and the like) on a terminal side are performed, but when robbery occurs in a state where lock is not set or in an unlocked state, it is impossible to perform complete prevention. For this reason, countermeasures for preventing unfair use on an internal, system side are required in addition to the countermeasures on the terminal side.

CITATION LIST

Patent Literature

PTL 1: JP-A-2006-260454
PTL 2: JP-A-2011-197802
PTL 3: JP-A-2009-175984

SUMMARY OF INVENTION

Technical Problem

PTL 1 discloses a method in which if a case where a user operation has a tendency different from the previous operation occurs, the case is detected, and then authentication is performed in another manner (mail or telephone) in performing online banking. As a specific example of the user operation, a tendency in a form of a password incorrectly being input, an input habit (full width/half width, and the presence or absence of a comma in inputting a numerical value), and the like are disclosed. However, a method in which a plurality of determination references are combined and detection is performed by using the combined references is not disclosed, and thus there is a problem in that a probability of incorrect detection is high. Determination processing is performed from only information which is transmitted to a server side and is input in an input entry. For this reason, if information is not for being input in a page corresponding to an input entry, it is impossible to perform determination and a timing for detection is limited. Further, when unfair use is detected, reauthentication is performed by using a mail or a telephone. Accordingly, there is a problem in that the cost for authentication is large.

PTL 2 discloses a method in which characteristics and a tendency of a website user are analyzed by using a feature quantity of an operation on a web browser. However, analysis details are designed depending on contents of a website and thus it is impossible to apply the method to a general website. Further, the method is for analyzing characteristics and a tendency of a website user and is not for determining whether or not there is unfair use.

PTL 3 discloses a method in which a probability of an access user being the intended person is calculated by using a bayesian network which is constructed from old conventional information. As the used conventional information, time information, an average typing speed of a keyboard or a typing speed between adjacent keys at a time of inputting an ID or a password, trace information of a mouse operation, and the like are disclosed. The time information includes the date of access, an access time zone, and the like. However, a specific probability calculation method using the conventional information is not disclosed and variation in the conventional information between users is not considered.

In the above-described related art, determination processing of unfair use is not performed by combining a plurality of determination references (feature quantity) and variation in the feature quantity between users is not considered, and thus there is a problem in that a probability of incorrect detection is high.

Considering these circumstances, an object of the invention is to improve detection accuracy of unfair use in a terminal.

Solution to Problem

A simple description of the summary of the representative technology among technologies disclosed in this application is as follows.

There is provided a method for detecting unfair use including: recording a plurality of operation feature quantities which are calculated from an operation log of a user and weights for the plurality of operation feature quantities of the user which are calculated by using a plurality of operation feature quantities of other users, obtaining an operation log of a terminal device, calculating a plurality of operation feature quantities from the operation log, calculating similarity between the calculated plurality of operation feature quantities and the recorded plurality of operation feature quantities of the user, by using the recorded weights for the plurality of operation feature quantities of the user, and detecting unfair use of the terminal device.

Advantageous Effects of Invention

According to the invention, it is possible to improve detection accuracy of unfair use of a terminal.

Problems, configurations and effects other than those in the above description are apparent through descriptions of the following embodiments.

BRIEF DESCRIPTION OF DRAWINGS

FIG. 3 is an example of an operation log table.

FIG. 4 is an example of an operation feature quantity table.

FIG. 5 is an example of an operation feature quantity weight table.

DESCRIPTION OF EMBODIMENTS

Hereinafter, an embodiment according to the invention will be described with reference to the accompanying drawings.

Example 1

Figure 1:
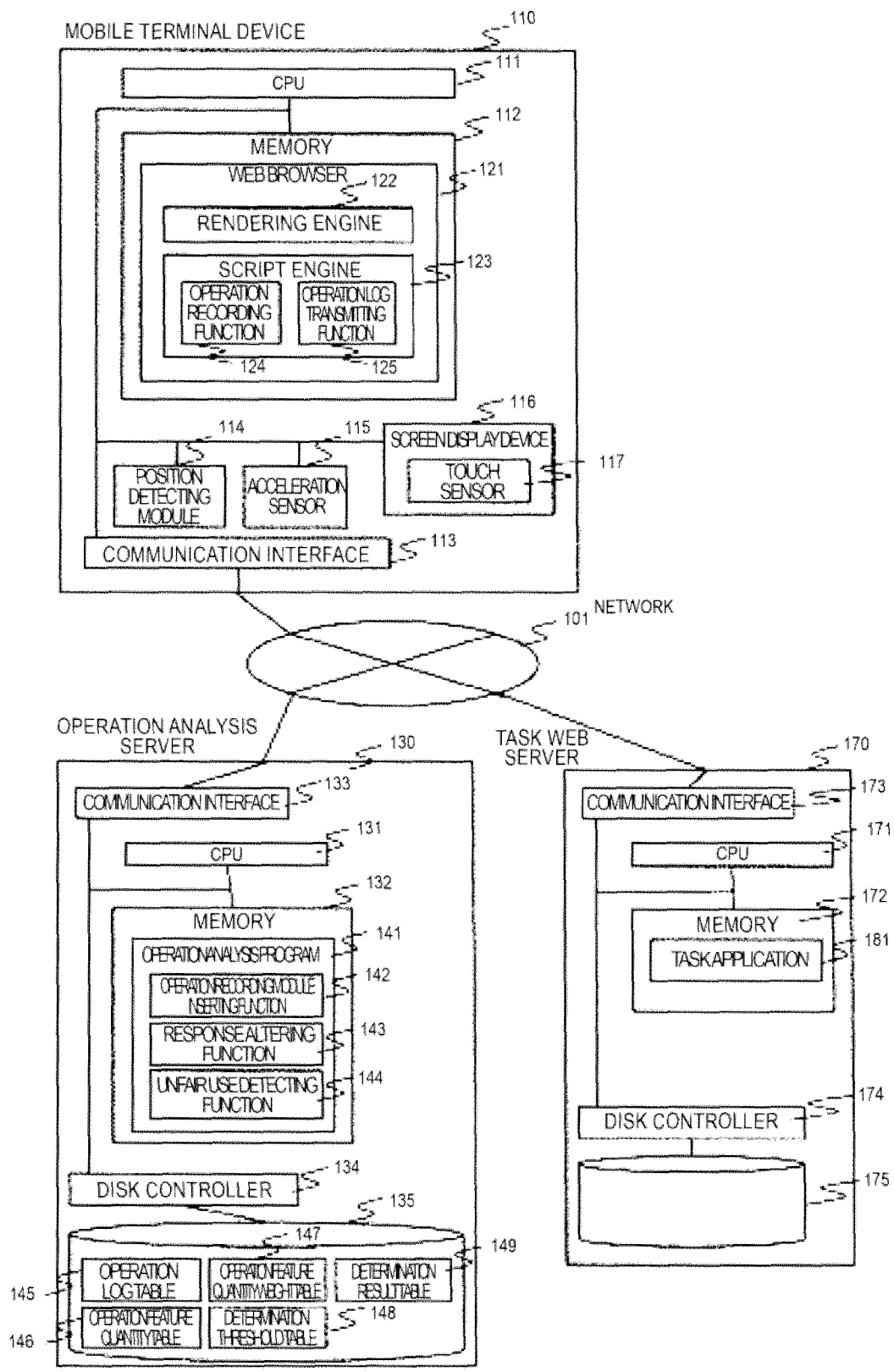
FIG. 1 is a diagram representing a hardware configuration of a system.

FIG. 1 is a block diagram illustrating an embodiment and illustrating a hardware configuration of a computation device system to which the invention is applied.

In FIG. 1, a mobile terminal device 110, an operation analysis server 130, and a task web server 170 are connected to a network 101. The mobile terminal device 110 is for a user performing a task, the operation analysis server 130 analyzes a terminal operation of a user and monitors unfair use, and the task web server 170 operates an application program for a user performing a task.

The mobile terminal device 110 includes a CPU 111 performing a computing process, a memory 112 storing a program or data, a communication interface 113 communicating with other servers through the network 101, a position detecting module 114 for detecting a position of a mobile terminal, an acceleration sensor 115 measuring an acceleration of the mobile terminal, a screen display device 116 for displaying an operation screen, and a touch sensor 117 for detecting a position which is touched by a user in the screen display device. A web browser 121 is operated by a user operating the touch sensor 117. Connection between the communication interface 113 and the network 101 may be one of a wired network and a wireless network.

The web browser 121 having a form of a program is in the memory 112 of the mobile terminal device 110. The web browser 121 includes a rendering engine 122 and a script engine 123. The rendering engine 122 displays a response from the task web server 170 on a screen. The script engine 123 performs an operation recording function 124 and an operation log transmitting function 125 which are included in the response. The operation recording function 124 records an operation performed on the web browser 121 by a user as an operation log. The operation log transmitting function 125 transmits the recorded operation log to the operation analysis server 130.

The operation analysis server 130 includes a CPU 131, a memory 132, a communication interface 133, a disk controller 134, and a local disk 135. An operation analysis program 141 is in the memory 132 of the operation analysis server 130. The operation analysis program 141 includes an operation recording module inserting function 142, a response altering function 143, and an unfair use detecting function 144. The CPU 131 reads and executes various programs recorded in the memory and thus the various functions are realized. An operation log table 145, an operation feature quantity table 146, an operation feature quantity weight table 147, a determination threshold table 148, and a determination result table 149 are stored in the local disk 135.

The task web server 170 includes a CPU 171, a memory 172, a communication interface 173, a disk controller 174, and a local disk 175. A task application program 181 is in the memory 172 of the operation analysis server 170. The task application program 181 is a program allowing an operation from a web browser to perform, for example, transmission and reception of a mail, product inventory control, diligence and indolence management, business item management, and the like.

First, a process of calculating an operation feature quantity weight necessary for an unfair use determining process will be described using FIGS. 2 to 7.

Figure 2:
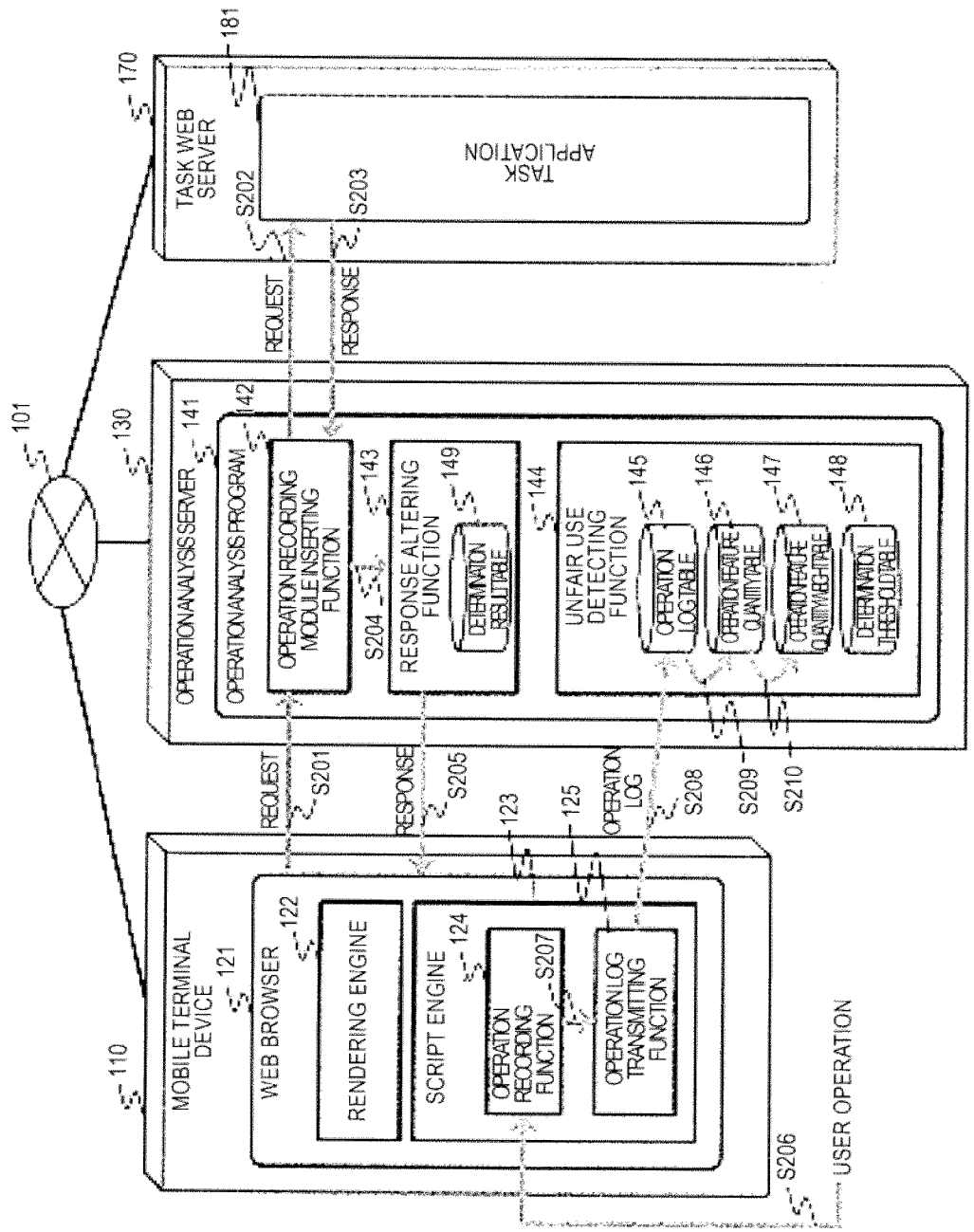
FIG. 2 is an example of a diagram representing a flow of an operation feature quantity weight calculating process.

FIG. 2 is a system configuration diagram representing a flow of a process when the operation feature quantity weight is calculated.

A user accesses the task application 181 operated by the task web server 170 by using the web browser 121 of the mobile terminal device 110. When the web browser 121 issues a request (S201), an operation recording module 142 of the operation analysis server 130 traps the request and the operation recording module 142 transmits the same request to the task application 181 of the task web server 170 (S202). The task application 181 transmits a response to the request (S203). The operation recording module 142 embeds the operation recording function 124 and the operation log transmitting function 125 in the received response, and transmits a result of embedment to the web browser 121 (S205).

A screen of the task application 181 is displayed in the web browser 121, and simultaneously the operation recording function 124 and the operation log transmitting function 125 are performed in the script engine 123. When a user performs an operation on the screen (S206), the operation recording function 124 records details of the performed operation (S207) and the operation log transmitting function 125 transmits the recorded details to the operation analysis server 130 (S208).

The unfair use detecting function 144 in the operation analysis server 130 stores an operation log in the operation log table 145 if the operation log is received from the mobile terminal device 110. The unfair use detecting function 144 calculates an operation feature quantity from the received operation log and stores the calculated operation feature quantity in the operation feature quantity table 146 (S209). The unfair use detecting function 144 calculates a weight for the feature quantity from the operation feature quantity table 146 and stores the calculated weight in the operation feature quantity weight table 147 (S210).

As described above, the operation recording module 142 embeds the operation recording function 124 and the operation log transmitting function 125 in the response (S205) which is transmitted to the mobile terminal device 110 and thus it is possible to automatically operate the operation recording function 124 and the operation log transmitting function 125 in the web browser 121 without changing the mobile terminal device 110 and the task web server 170.

FIG. 3 illustrates an example of the operation log table 145.

The operation log table 145 includes an ID 301 for identifying a user, the date 302 at which an operation is performed, a URL 303 of a web page in which the operation is performed, an event type 304 occurring by the operation, and an attribute value 305 in accordance with the event type.

As an example, when a user displays a web page, an operation log record having an event type of "load" is recorded. When the user displays other web pages or closes a web browser, an operation log record having an event type of "unload" is recorded. When a user touches a touch panel with his or her hand, an operation log record having an event type of "touch start" is recorded. When the hand is separated from the touch panel, an operation log record having an event type of "touch end" is recorded. At this time, a coordinate on the touch panel when touch is performed with the hand or a coordinate on the touch panel when the hand is separated is recorded in the attribute value.

When a user scrolls a web page displayed in a web browser, an event type of "scroll" is recorded along with movement amount by scrolling.

When a user inputs text in an input field of a web page, details of the text are recorded as "key press".

When a user presses a button displayed on a web page, a link for moving to other web pages, or the like, "click" is recorded.

When a user changes a screen display direction (transverse direction or longitudinal direction) of the mobile terminal device 110, an event type of "orientation change" is recorded.

Position information (latitude, longitude, and movement speed) of the terminal obtained from the position detecting module 114 is recorded as an event type of "geo-location".

Acceleration information obtained from the acceleration sensor 115 is recorded as an event type of "device motion".

FIG. 4 illustrates an example of the operation feature quantity table 146.

Regarding a result obtained by combining a URL 401 of a web page, an ID 402 for identifying a user, and a use circumstance 403 of the mobile terminal device, N operation feature quantities 404 to 406 are recorded in the operation feature quantity table 146. Here, a value of an operation feature quantity $V_i$ of a user X when a use circumstance corresponds to "on a table" is described as $V_{Xi\_D}$ and the value of an operation feature quantity $V_i$ when the use circumstance corresponds to "held with hand" is described as $V_{Xi\_H}$. The use circumstance 403 will be described in detail in a description of FIG. 7.

The operation feature quantity is calculated from the acceleration information obtained by the acceleration sensor 115 of the mobile terminal, the position information obtained by the position detecting module 114, the operation information of the touch panel obtained by the touch sensor 117, and the like.

Here, the operation feature quantity refers to as follows, for example: a reading time of a page which is calculated from a time required from "load" to "unload", a touch average time calculated from an average of a time required from "touch start" to "touch end", a scrolling operation speed calculated from a movement amount by scrolling and a touch time required when scrolling is performed, a scrolling operation position on the touch panel which is calculated from a coordinate of "touch start" and a coordinate of "touch end", an operation direction and frequency of expansion-reduction of a web page display performed by a touch operation which is calculated from a coordinate of "touch start" and a coordinate of "touch end", an input speed of letters which is calculated from "key press", the screen display direction (transverse/longitudinal) recorded in "orientation change", an angle and vibration amount of a terminal which are calculated from acceleration recorded in "device motion".

An operation feature quantity average value $V_{i\_avg}$ which is obtained by averaging operation feature quantities of all users for each web page is stored in the operation feature quantity table 146.

FIG. 5 illustrates an example of the operation feature quantity weight table 147.

Regarding a result obtained by combining a URL 501 of a web page, an ID 502 for identifying a user, a use circumstance 503 of a mobile terminal device, N operation feature quantity weights 504 to 506 are included in the operation feature quantity weight table 147. A value $W_i$ of an operation feature quantity weight for an operation feature quantity $V_i$ of a user X is described as $W_{Xi\_D}$.

Figure 6:
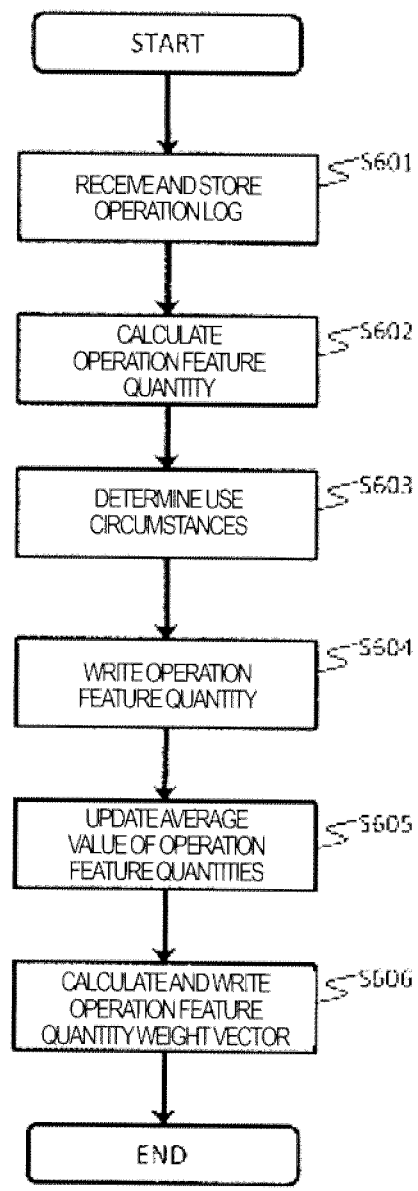
FIG. 6 is an example of a flowchart representing an operation feature quantity weight table calculating process in an unfair use detecting function.

FIG. 6 illustrates a flowchart of a feature quantity weight calculation process in the unfair use detecting function 144.

When an operation log of a user is received from the mobile terminal device 110, the operation log is written in the operation log table 145 (S601). Then, an operation feature quantity of the user is calculated based on the received operation log (S602). A use circumstance of the mobile terminal of the user is determined by a use circumstance determining process which will be described in FIG. 7 (S603). An operation feature quantity regarding a URL of the web page and the user ID and the use circumstance is written in the operation feature quantity table 146 (S604). The average value $V_{i\_avg}$, is calculated again and updated in the operation feature quantity table 146 (S604).

An operation feature quantity weight is calculated by using Math 1 and the operation feature quantity weight in the use circumstance of the user determined in S604 is recorded (S606).

$$W_{uk} = \frac{(V_{uk} - V_{k\_avg})^2}{\sum_{i=1}^{N} (V_{ui} - V_{i\_avg})^2} \qquad [\text{Math. 1}]$$

The operation feature quantity weight is calculated in Math 1 such that a weight for a feature quantity which is different from the average of all users has a large value. Thus, a feature quantity weight for an operation which easily appears characteristics of each user has a large value, and thus an effect of improving detection accuracy of unfair use is obtained.

Figure 7:
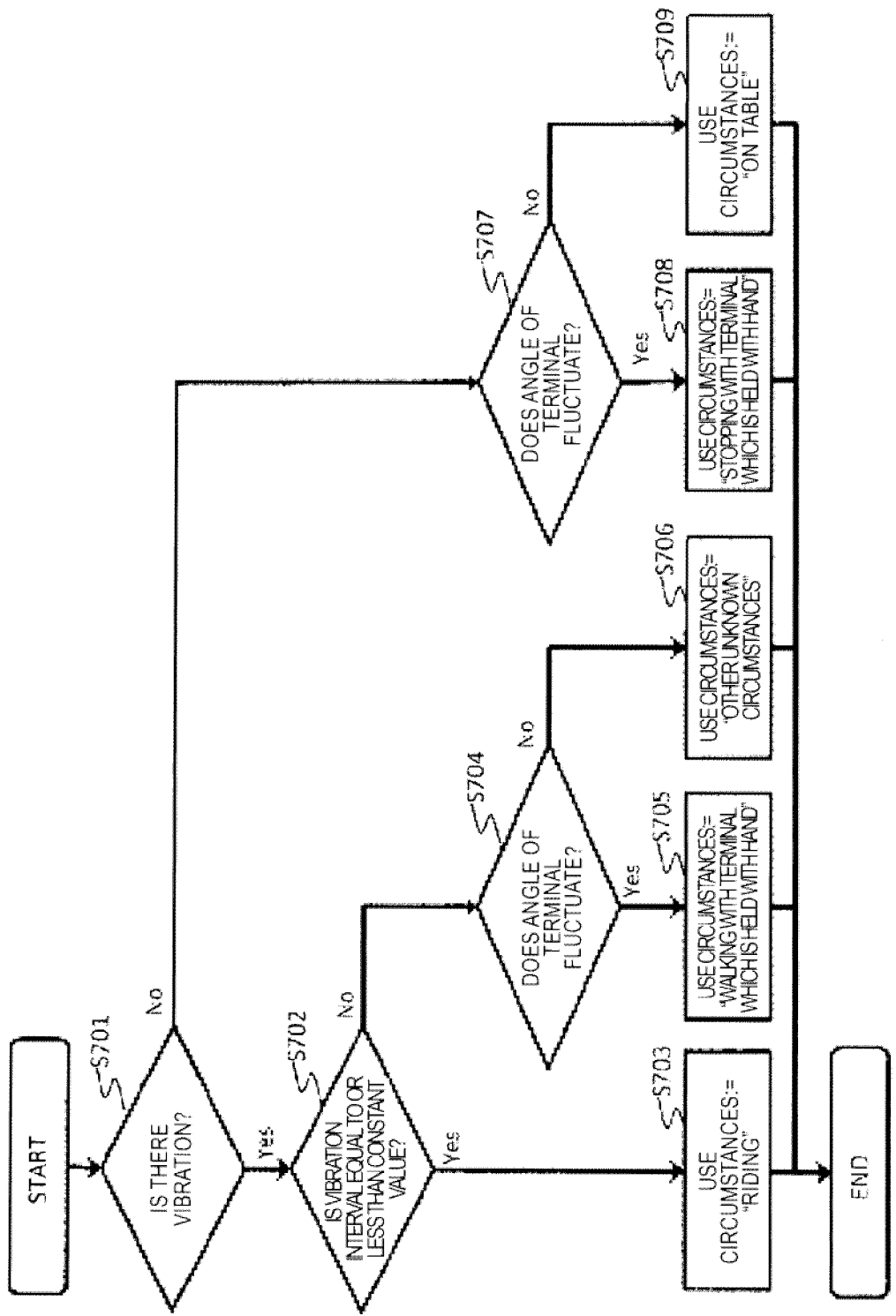
FIG. 7 is an example of a flowchart representing a use circumstance determining process in the unfair use detecting function.

FIG. 7 illustrates a flowchart of the use circumstance determining process (S603) in the unfair use detecting function 144.

It is determined whether a vibration amount is equal to or more than a constant value by using the vibration amount stored in the operation feature quantity table 146 (S701). When the vibration amount exceeds the constant value, it is determined whether a vibration period is equal to or less than a constant value (S702). When the vibration period is equal to or less than the constant value, it is determined to be "riding" an electric car, an automobile, or the like (S703). When the vibration period is equal to or more than the constant value, it is determined whether fluctuation in an angle of the terminal occurs (S704). When the fluctuation occurs, it is determined that the terminal is in a state of "walking with terminal which is held with hand" (S705). When the fluctuation in the angle of the terminal does not occur, it is determined that the use circumstance is "other unknown circumstances" (S706). In S701, when the vibration amount is equal to or less than the constant value, similarly to S704, it is also determined whether fluctuation in an angle of the terminal occurs (S707). When the fluctuation occurs, it is determined that the terminal is in the state of "walking with terminal which is held with hand" (S708). When the fluctuation in the angle of the terminal does not occur, it is determined that the use circumstance is "on a table" (S709).

In the above descriptions, an example in which the determining process is performed by using the angle of the terminal and the vibration amount is illustrated. However, terminal position information may be combined with the angle of the terminal and the vibration amount and determination may be performed by using a result of combination.

The mobile terminal device has large different operation tendencies between when the mobile terminal is placed on a table and an operation is performed with both hands and when the mobile terminal is held with one hand and an operation is performed with another hand. An operation tendency may be changed by the surrounding environment when a user of the mobile terminal goes walking or rides a train, an automobile, or the like. For this reason, as described above, the use circumstance of the mobile terminal device is determined from the vibration amount or the angle of the terminal (S604). It is possible to expect improvement of detection accuracy of unfair use by calculating the operation feature quantity weight for each use circumstance.

Hitherto, a process of calculating the operation feature quantity weight is described. Then, a flow in a process of performing an unfair use detecting process when a user performs access will be described using FIGS. 8 to 11.

Figure 8:
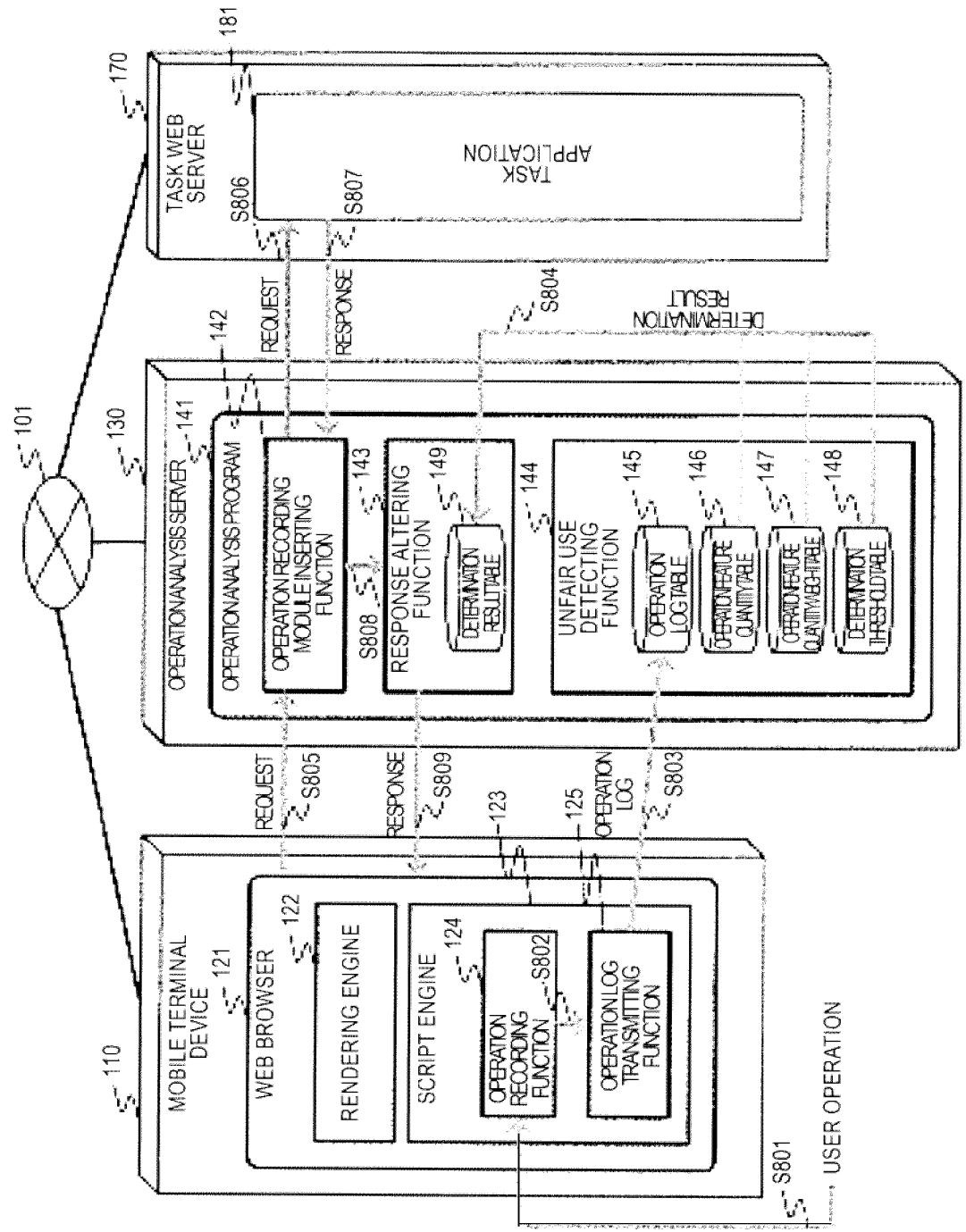
FIG. 8 is an example of a diagram representing a flow of an unfair use determining process.

FIG. 8 is a system configuration diagram representing a flow of the unfair use detecting process.

When a user displays and operates a screen of the task application 181 in the web browser 121 (S801), the operation recording function 124 and the operation log transmitting function 125 cause an operation log to be transmitted to the operation analysis server 130 (S802 and S803). The unfair use detecting function 144 in the operation analysis server 130 stores an operation log in the operation log table 145 when the operation log from the mobile terminal device 110 is received. An operation feature quantity is calculated from the received operation log and an operation feature quantity and an operation feature quantity weight which correspond to an ID of the user are obtained from the operation feature quantity table 146 and the operation feature quantity weight table 147. Similarity is calculated between the operation feature quantity calculated from the received operation log and the operation feature quantity recorded in the operation feature quantity table 146. At this time, similarity of the operation feature quantity with weight is calculated by using the operation feature quantity weight recorded in the operation feature quantity weight table 147. Thus, the similarity of the operation feature quantity may be calculated by considering a feature quantity of causing characteristics of a regular user to appear easily as more important, and thus it is possible to improve determination accuracy of unfair use. A method of calculating the similarity of the feature quantity with weight will be described in detail using a description of FIG. 11 which will be described later. The similarity of the feature quantity with weight is set to be an unfair use probability. An unfair use determination result is calculated by comparing the calculated unfair use probability to determination threshold stored in the determination threshold table 148 and stored in the determination result table 149 (S804).

Then, when a request for a web page is performed by a user, a flow from S805 to S808 is the same as the flow from S201 to S204 in FIG. 2. However, the response altering function 143 alters a response transmitted to the mobile terminal device 110 based on the determination result for the user with reference to the determination result table 149 (S809).

A user ID or a password being input again in a mobile terminal every time causes an operation of the user to be inconvenient in reauthentication when a probability of unfair use is suspected. Thus, in this example, a reauthentication method is changed in accordance with an unfair use probability. With this, authentication is completed without performing inconvenient authentication using a user ID or a password, and therefore it is possible to improve usability. Details thereof will be described below.

Figure 9:
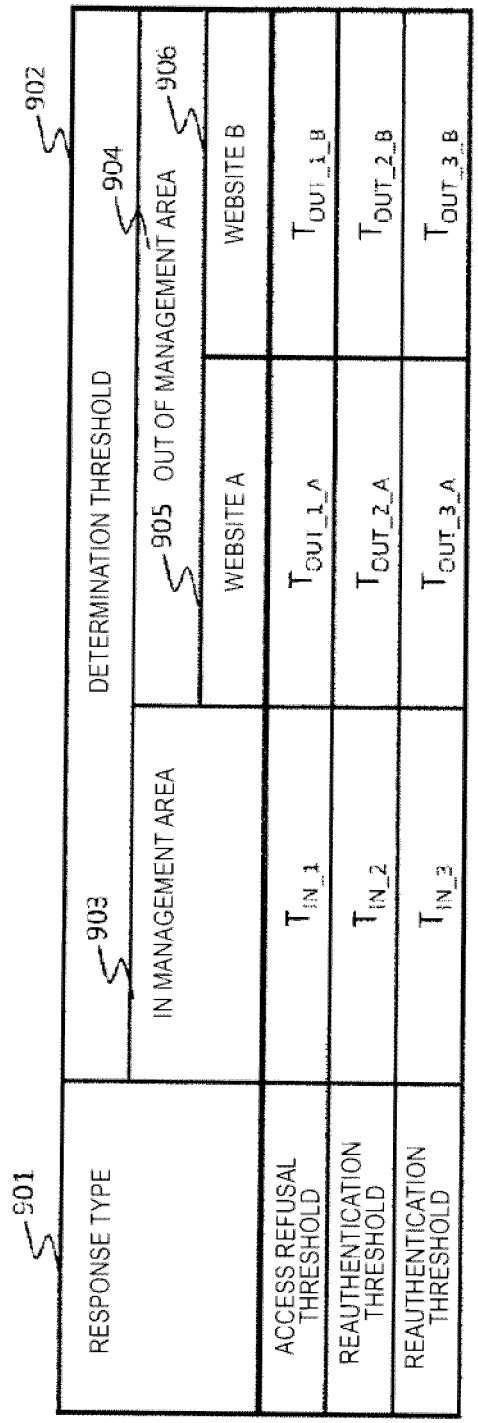
FIG. 9 is an example of a determination threshold table.

FIG. 9 illustrates an example of the determination threshold table 148.

A response type 901 and determination threshold 902 corresponding to each of the response types are included in the determination threshold table 148. The determination threshold 902 is configured from determination threshold 903 when a terminal is in a management area and determination threshold 904 when the terminal is out of the management area. The determination threshold 904 when the terminal is out of the management area is configured from a determination threshold 905 when an access destination of a user is a website A and determination threshold 906 when the access destination is a website B. The management area refers to a location of allowing a terminal to be used in safety, for example, to a working room of an office. In this example, only the determination threshold 904 when the terminal is out of the management area is set to be different threshold depending on a website being the access destination. However, the determination threshold 903 when the terminal is in the management area may also be set to be determination threshold for each website, similarly.

It is determined whether the terminal is in the management area, from position information of the terminal. When the terminal is in the management area, if the unfair use probability is equal to or more than $T_{IN\_1}$, the determination result indicates access refusal. If the unfair use probability is equal to or more than $T_{IN\_2}$ and less than $T_{IN\_1}$, the determination result indicates need for authentication. If the unfair use probability is equal to or more than $T_{IN\_3}$ and less than $T_{IN\_3}$, the determination result indicates need for reoperation and if the unfair use probability is less than $T_{IN\_3}$, the determination result indicates no problem. When the terminal is out of the management area, similar determination is performed by using $T_{OUT\_1}$ to $T_{OUT\_3}$. The operation analysis server holds position information corresponding to the inside or outside of the management area in advance in order to determine whether the terminal is in the management area. The determination threshold may be set by a manager of the operation analysis server in the outside of the system.

The determination threshold for the outside of the management area 904 ($T_{OUT\_1}$ to $T_{OUT\_3}$) is set to be lower than the determination threshold for the inside of management area 903 ($T_{IN\_1}$ to $T_{IN\_3}$) and thus it is possible to increase unfair use detecting probability in a circumstance such as moving, in which robbery or loss of a terminal occurs easily. Tightened determination threshold is set in a website having high confidentiality and relaxed determination threshold is set in a website having low confidentiality by using determination threshold in accordance with an access destination website. Accordingly, it is possible to perform a determining process in accordance with characteristics of a website.

Figure 10:
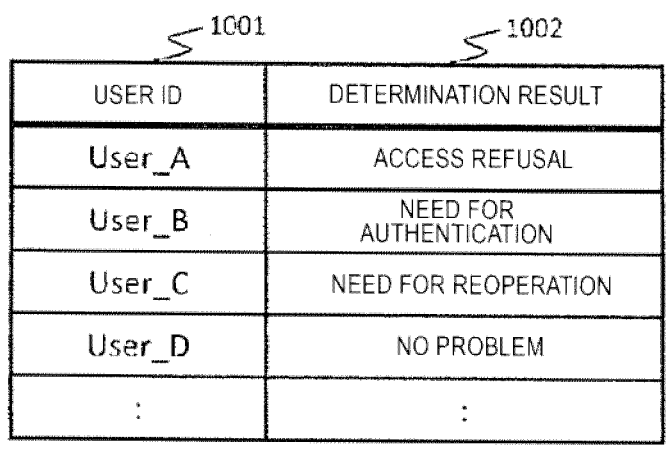
FIG. 10 is an example of a determination result table.

FIG. 10 illustrates an example of the determination result table 149.

A user ID 1001 and determination result 1002 corresponding to the user ID are included in the determination result table 149.

The response altering function 143 obtains unfair use determination result corresponding to the user ID of a user, from the determination result table 149 when a request is performed by the user. The response altering function 143 alters a response in accordance with the unfair use determination result and transmits the response to the web browser 121.

When the unfair use determination result indicates "access refusal", the response is not transmitted and an access from the user is refused. When the unfair use determination result indicates "need for authentication", the user is caused to move to a web page for authentication using a user ID and a password. When the unfair use determination result indicates "need for reoperation", the user is caused to move to other web page at which a difference of the operation feature quantity appears easily. Regarding a web page to which the user is caused to move, operation feature quantity sensitivity of each web page for a user is calculated by using Math 2 and a web page having the highest operation feature quantity sensitivity is selected as a movement destination page.

$$S(X) = \sum_{i=1}^{N} W_{Xi} \frac{(V_{Xi} - V_{i\_avg})^2}{V_{i\_avg}^2} \quad \text{[Math. 2]}$$

When the unfair use determination result indicates "no problem", the response is not altered and transmitted to the web browser 121.

As described above, when the unfair use probability is not high, authentication is completed without performing an inconvenient procedure using a user ID and a password by changing a reauthentication method in accordance with the unfair use probability. Accordingly, it is possible to improve usability.

Figure 11:
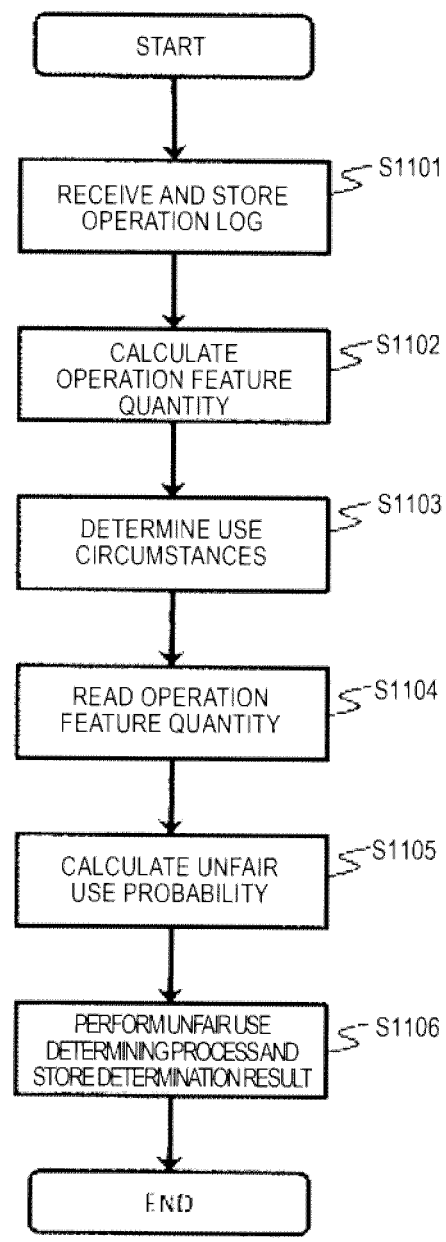
FIG. 11 is an example of a flowchart representing the unfair use determining process in the unfair use detecting function.

FIG. 11 illustrates a flowchart of the unfair use determining process in the unfair use detecting function 144.

When an operation log of a user is received from the mobile terminal device 110, the operation log is written in the operation log table 145 (S1101). Then, an operation feature quantity of the user is calculated based on the received operation log (S1102). A use circumstance of the mobile terminal of the user is determined by a use circumstance determining process which will be described in FIG. 7 (S1103). An operation feature quantity corresponding to a result obtained by combining a web page URL, a user ID, and a use circumstance is obtained from the operation feature quantity table 146 (S1104). An unfair use probability is calculated by using Math 3 (S1105). The unfair use determining process is performed by using the calculated unfair use probability and the determination threshold table 148 and a determination result is written in the determination result table (S1106)

$$C(X, Y) = \sum_{i=1}^{N} W_{Xi} \frac{(V_{Yi} - V_{Xi})^2}{V_{Xi}^2} \quad \text{[Math. 3]}$$

In the above configuration of the example, a plurality of operation feature quantities are combined and it is possible to improve detection accuracy of unfair use through an operation feature quantity weight calculation determining process for considering variation in the operation feature quantity between users.

Authentication is completed without performing inconvenient authentication using a user ID or a password by changing a reauthentication method in accordance with an unfair use probability. Accordingly, it is possible to improve usability.

Example 2

In this example, a method of performing the unfair use determining process on the mobile terminal device 110 side will be described.

Figure 12:
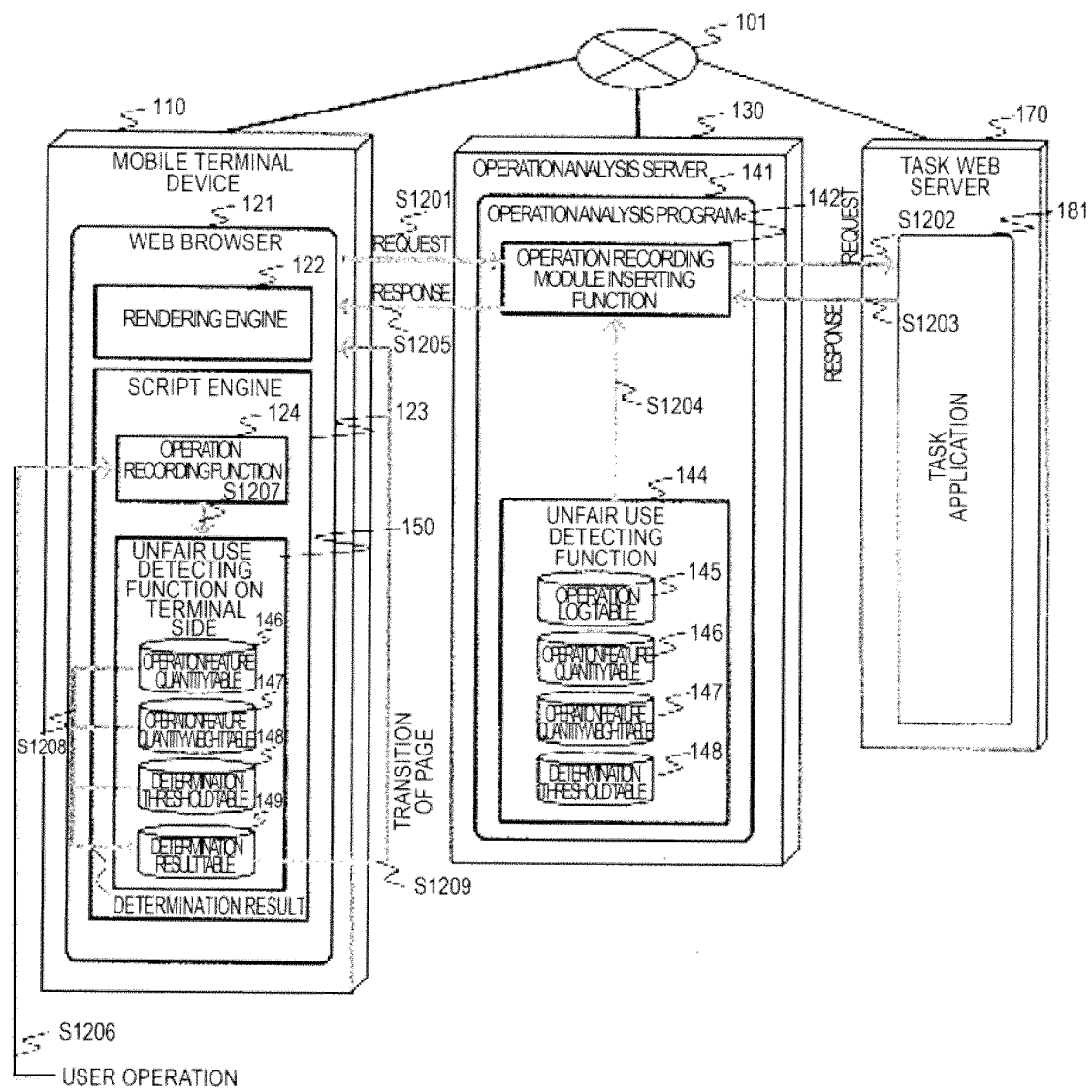
FIG. 12 is an example of a diagram representing a configuration and a flow of an operation in the system when unfair use is detected in a mobile terminal device.

FIG. 12 illustrates a system configuration and a flow of the process when the unfair use determining process is performed on the mobile terminal device 110 side.

A user accesses task application 181 being operated in the task web server 170 using the web browser 121 of the mobile terminal device 110. When the web browser 121 issues a request (S1201), the operation recording module 142 of the operation analysis server 130 traps the request and the operation recording module 142 transmits the same request to the task application 181 of the task web server 170 (S1202). The task application 181 transmits a response to the request (S1203). The operation recording module 142 embeds the operation recording function 124 and a function of detecting unfair use on terminal side 150 in the received response, and transmits a result of embedment to the web browser 121 (S1205). At this time, information relating to the user in the operation feature quantity table 146, the operation feature quantity weight table 147, and the determination threshold table 148 of the operation analysis server is transmitted to the function of detecting unfair use on terminal side 150 (S1204).

When the user displays and operates a screen of the task application 181 in the web browser 121 (S1206), details of an operation is obtained by the operation recording function 124 (S1207).

The function of detecting unfair use on terminal side 150 performs the unfair use determining process by using the obtained details of the operation, and the operation feature quantity table 146, the operation feature quantity weight table 147, and the determination threshold table 148. The function of detecting unfair use on terminal side 150 stores a result of the unfair use determining process in the determination result table 149. A determining process method at this time is the same as that illustrated in FIG. 11.

The function of detecting unfair use on terminal side 150 performs a page transition request to the web browser 121 based on the determining process result (S1209).

As described above, it is possible to perform the unfair use detecting process at any timing without a limit of a timing at which a user accesses a web page by the unfair use detecting process being performed in the mobile terminal device 110.

In the above described Example 1 and Example 2, the operation recording function 124, the operation log transmitting function 125, and the function of detecting unfair use on terminal side 150 being operated in the web browser 121 is described. However, these functions may be operated in an individual program corresponding to the task application instead of the web browser.

Further, the operation analysis program 141 may be operated in the task server 170 and the operation analysis server 130 may be not required.

The invention is not limited to the above-described examples and includes various modifications. For example, the above-described examples are described in detail in order to describe easy understanding of the invention and are not necessarily limited to including all of the described components. Replacement of some parts of the configuration in one example with those of the configuration in another example is allowed and addition of a component in one example to a component in another example is also allowed. Some parts of the configuration in each example may be added-deleted-replaced to and with another configuration. Some or all of the components, the functions, the processing units, the processing means, and the like may be realized as hardware by, for example, designing an integrated circuit and the like. The components, functions, and the like may be realized as software by analyzing and executing the program for a processor performing the functions. Information such as a program, a table, and a file, for performing each function may be stored in a memory, a recording device such as a hard disk and a solid state drive (SSD), or a recording medium such as an IC card, a SD card, and a DVD.

Control lines or information lines which are considered to be necessary for descriptions are illustrated and all of the control lines or the information lines in a product are not illustrated. In practice, almost of components may be considered to be connected to each other.

REFERENCE SIGNS LIST

110 MOBILE TERMINAL DEVICE
130 OPERATION ANALYSIS SERVER
170 TASK WEB SERVER
121 WEB BROWSER
141 OPERATION ANALYSIS PROGRAM
142 OPERATION RECORDING MODULE INSERTING FUNCTION
143 RESPONSE ALTERING FUNCTION
144 UNFAIR USE DETECTING FUNCTION
145 OPERATION LOG TABLE
146 OPERATION FEATURE QUANTITY TABLE
147 OPERATION FEATURE QUANTITY WEIGHT TABLE
148 DETERMINATION THRESHOLD TABLE
149 DETERMINATION RESULT TABLE
181 TASK APPLICATION

The invention claimed is:

1. A method for detecting unfair use of a terminal device, comprising:
recording a plurality of operation feature quantities of a user, which are determined from an operation log of the user, and weights for the plurality of operation feature quantities of the user, which are calculated by using a plurality of operation feature quantities of other users;
obtaining an operation log of the terminal device;
determining a plurality of operation feature quantities of the terminal device from the operation log of the terminal device; and
calculating similarity between (i) the determined plurality of operation feature quantities of the terminal device and (ii) the recorded plurality of operation feature quantities of the user, by using the recorded weights for the plurality of operation feature quantities of the user, and detecting the unfair use of the terminal device,
wherein the operation feature quantities are determined by using at least one of acceleration information, position information of the terminal device, or operation information of a touch panel in the terminal device.

2. The method according to claim 1, further comprising:
determining a use circumstance of the terminal device from the operation feature quantities,
wherein the similarity is calculated by using the weights for the plurality of operation feature quantities of the user corresponding to the determined use circumstance.

3. The method according to claim 1, wherein the plurality of operation feature quantities and the weights for the plurality of operation feature quantities of the user are recorded in each web page which is accessed by the user.

4. The method according to claim 1, further comprising:
changing a reauthentication method in accordance with the similarity.

5. The method according to claim 4, further comprising:
comparing the similarity to a predetermined threshold; and
selecting any one of refusing an access to a web page, displaying the web page for reauthentication in the terminal device, and displaying the web page for the user of the terminal device performing reoperation in the terminal device, in accordance with the result of the comparison.

6. The method according to claim 5, wherein the predetermined threshold is changed in accordance with a website being an access destination or the position information of the terminal device.

7. A device for detecting unfair use of a terminal device, comprising:
at least one hardware processor coupled to memory, the at least one hardware processor configured to execute:
a recording section that records a plurality of operation feature quantities of a user, which are determined from an operation log of the user, and weights for the plurality of operation feature quantities of the user, which are calculated by using a plurality of operation feature quantities of other users;
an operation log obtaining section that obtains an operation log of the terminal device;
an operation feature quantity calculating section that determines a plurality of operation feature quantities of the terminal device from the operation log of the terminal device; and
an unfair use detecting section that calculates similarity between (i) the determined plurality of operation feature quantities of the terminal device and (ii) the recorded plurality of operation feature quantities of the user, by using the recorded weights for the plurality of operation feature quantities of the user, and detects the unfair use of the terminal device,
wherein the operation feature quantity calculating section determines the plurality of operation feature quantities by using at least one of acceleration information, position information of the terminal device, or operation information of a touch panel in the terminal device.

8. The device according to claim 7, further comprising the at least one hardware processor configured to execute:
a use circumstance determining section that determines a use circumstance of the terminal device from the operation feature quantities,
wherein the unfair use detecting section calculates the similarity by using the weights for the plurality of operation feature quantities of the user corresponding to the determined use circumstance.

9. The device according to claim 7, wherein
the recording section records the plurality of operation feature quantities and the weights for the plurality of operation feature quantities of the user in each web page which is read by the user.

10. The device according to claim 7, wherein
a reauthentication method is changed in accordance with the similarity.

11. The device according to claim 10, wherein
the similarity is compared to a predetermined threshold, and
any one of refusing an access to a web page, displaying the web page for reauthentication in the terminal device, and displaying the web page for the user of the terminal device performing reoperation in the terminal device, is selected in accordance with the result of the comparison.

12. The device according to claim 11, wherein
the predetermined threshold is changed in accordance with a website being an access destination or the position information of the terminal device.

13. A system for detecting unfair use of a terminal device, comprising:
at least one hardware processor coupled to memory, the at least one hardware processor configured to:
record a plurality of operation feature quantities of a user, which are determined from an operation log of the user, and weights for the plurality of operation feature quantities of the user, which are calculated by using a plurality of operation feature quantities of other users;
obtain an operation log of the terminal device;
determine a plurality of operation feature quantities of the terminal device from the operation log of the terminal device; and
calculate similarity between (i) the determined plurality of operation feature quantities of the terminal device and (ii) the recorded plurality of operation feature quantities of the user, by using the recorded weights for the plurality of operation feature quantities of the user, and detect the unfair use of the terminal device,
wherein the operation feature quantities are determined by using at least one of acceleration information, position information of the terminal device, or operation information of a touch panel in the terminal device.

* * * * *